United States Patent [19]

Boggs

[11] 4,299,930
[45] Nov. 10, 1981

[54] MULTI-COMPONENT HOT MELT ADHESIVES HAVING EXCELLENT HIGH TEMPERATURE PROPERTIES

[75] Inventor: Brenda J. Boggs, Longview, Tex.

[73] Assignee: Eastman Kodak Company, Rochester, N.Y.

[21] Appl. No.: 138,048

[22] Filed: Apr. 7, 1980

[51] Int. Cl.³ .................. C08L 23/26; C08L 31/04
[52] U.S. Cl. ........................ 525/74; 260/27 EV; 525/193; 525/222; 525/78; 525/80; 525/81
[58] Field of Search ............ 525/74, 193, 222, 78, 525/80, 81; 260/27 EV

[56] References Cited

U.S. PATENT DOCUMENTS

| | | | |
|---|---|---|---|
| 3,468,978 | 9/1969 | Battersby | 525/222 |
| 3,644,254 | 2/1972 | Dew | 525/222 |
| 3,658,948 | 4/1972 | McConnell | 525/74 |
| 3,856,889 | 12/1974 | McConnell | 525/74 |
| 3,868,433 | 2/1975 | Bartz et al. | 525/193 |
| 3,886,234 | 5/1975 | Ishihara et al. | 525/193 |

*Primary Examiner*—Carman J. Seccuro
*Attorney, Agent, or Firm*—Clyde L. Tootle; Daniel B. Reece, III

[57] ABSTRACT

The hot melt adhesives of the present invention comprise a blend of at least one modified polyethylene resin, an ethylene/vinyl acetate copolymer, a tackifying resin, and an ethylene/propylene rubber. This hot melt adhesive has a novel combination of properties including excellent elevated temperature properties which also provides excellent adhesion to nonporous substrates such as fluorocarbon treated paper which is used as an oil and grease barrier in multiwall bags.

8 Claims, No Drawings

MULTI-COMPONENT HOT MELT ADHESIVES HAVING EXCELLENT HIGH TEMPERATURE PROPERTIES

This invention relates to modified polyethylene containing hot melt adhesives. One aspect of this invention concerns a modified polyethylene containing hot melt adhesive having a novel combination of properties. Another aspect of this invention concerns a modified polyethylene containing hot melt adhesive that has good adhesive properties for bonding nonporous substrates as well as excellent elevated temperature properties.

Hot melt adhesives are widely used in industry for various applications such as in product assembly. For example, one such application is in the bonding of nonporous substrates, such as foil-to-foil and paper-to-foil. Previously, to obtain satisfactory bonding for nonporous substrates it was necessary to use an ethylene vinyl acetate based hot melt adhesive. However, ethylene vinyl acetate based adhesives have poor elevated temperature properties. The ethylene vinyl acetate based adhesives have the disadvantage that at elevated temperature they decompose easily. Moreover, it was not possible to modify the ethylene vinyl acetate based adhesives with polyolefins to improve the elevated temperature properties as the blends were incompatible. Therefore, it would be an advance in the state of the art to provide a modified polyethylene based hot melt adhesive useful for bonding nonporous substrates and having excellent elevated temperature properties.

It is, therefore, an object of the present invention to provide a novel hot melt adhesive.

Another object of this invention is to provide a hot melt adhesive that is capable of bonding nonporous substrates.

A further object of the present invention is to provide a polyethylene containing hot melt adhesive which can be used in rapid bonding of nonporous substrates and has excellent elevated temperature properties.

Another and further object of this invention is to provide an adhesive having good adhesion properties which can be applied without the use of a solvent.

In accordance with the present invention I have found that a blend comprising at least one modified polyethylene resin, an ethylene/vinyl acetate copolymer, a tackifying resin, and an ethylene/propylene rubber, provides a hot melt adhesive which can be applied without solvents and has a novel combination of properties including excellent bonding to nonporous substrates, good bond aging properties and excellent elevated temperature properties.

The modified polyethylene can be any modified polyethylene having a saponification number of about 3 to 60 prepared by reacting polyethylene with an unsaturated polycarboxylic acid, anhydride or ester thereof by processes also well known in the art, as for example, U.S. Patent No. 3,856,889. The polyethylene reacted with this unsaturated component can be low molecular weight or degraded polyethylene. The modified polyethylene can be used alone as the polyethylene component or blends of such modified polyethylene with unmodified polyethylene or blends of modified polyethylene and blends of more than one unmodified polyethylene can also be used.

The ethylene-vinyl acetate copolymers useful in the practice of this invention may contain from about 30 to about 45 weight percent vinyl acetate but the preferred range is about 40 weight percent. The melt index of these ethylene vinyl acetate copolymers may range from about 10 to about 500 but is preferably in the range of about 40 to about 150 to produce moderate viscosity adhesives which are easily applied during multiwall bag manufacturing operations.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like. One such suitable hydrocarbon tackifying resin is a hydrocarbon resin having a softening point of 130° C. and available commercially as Eastman Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 75° to 150° C.; an acid number of from about 0 to 2; a saponification value of less than about 1; and an iodine value of from about 75-100. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the rosin ester resins and the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terepentine, a terpene cut of fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process.

The ethylene-propylene rubbers useful in the present invention are well-known materials and can be prepared by copolymerizing ethylene and propylene. Small amounts of a third monomer, such as a nonconjugated diene, can be added to provide unsaturation. The polymerization is usually carried out at a temperature below 100° C. using a coordination catalyst such as one comprised of aluminum alkyls and alkyl aluminum chloride and vanadium oxychloride. These ethylene-propylene rubbers contain 0 to 5 mole percent unsaturation, have an ethylene content of 50 to 90 weight percent, preferably 65 to 80 weight percent, and have a flow rate at 230° C. of about 0.2 to 0.8, preferably about 0.4 to about 0.6. An example of one such commercially available ethylene-propylene rubber useful in the present invention is Epcar 306G8 rubber available from Exxon Chemicals. These rubbers can be used alone or in combinations of such rubbers.

The ethylene/propylene rubber can be used in amounts of about 7 to 15 percent by weight of the adhesive composition, preferably about 7 to 10 percent by weight. The hydrocarbon resins and polyterpene tackifying resins can be used either alone or in combination. These tackifying resins can be used in amounts of about 30 percent to about 50 percent by weight of the adhesive composition, preferably about 35 to 45 percent by weight. The modified polyethylene or a blend of such polyethylenes can be used in amounts of 40 to 50 percent by weight in the adhesive formulation, preferably 42 to 46 percent by weight. The ethylene/vinyl acetate copolymer can be used in an amount of 6 to 10 percent by weight, preferably 7 to 9 percent by weight.

The adhesives of the present invention have a particular combination of properties including good bond strength to nonporous substrates, good elevated temperature properties, good bond integrity and flexibility. The components of the adhesive within the above ranges provide an adhesive which has these highly desired properties. If the amounts of the components are modified from these ranges, the desirable combination of properties of the adhesive are affected. For example, if the ethylene/propylene rubber is used in an amount greater than about 15 percent, the adhesive loses cohesive bond strength and is too viscous. If the ethylene/propylene rubber present in an amount less than about 7 percent the adhesive becomes brittle and doesn't have the desirable flex properties. If the modified polyethylene is used in an amount greater than 50 percent, the adhesion properties of the adhesive to a nonporous substrate are lowered. Likewise, if less than 30 percent tackifier is used the adhesion properties of the adhesive are lowered as well as the elevated temperature properties are also lowered. If less than 7 percent ethylene/vinyl acetate copolymer is used the integrity of the bond strength is decreased. More than 15 percent ethylene/vinyl acetate adversely affects the elevated temperature properties.

The adhesive compositions of this invention are prepred by blending together the adhesive components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles stirrer provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 percent to about 1.5 percent by weight, preferably about 0.25 percent to 1.0 percent by weight, of one or more antioxidants. Antioxidants that are effective include, for example, tris(di-t-butyl-p-hydroxybenzyl)-trimethylbenzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene-3',5-di-t-butyl-4-hydroxyphenyl)propionate]methane (Irganox 1010), lauryl stearyl thiodipropionate (Plastanox 1212), and dilauryl 3,3'-thiodipropionate (Plastanox DLTDP sold by American Cyanamid) and 2,6-di-tert-butyl-p-cresol (BHT) and disteryl pentaerythritol diphosphite (Weston 618) and the like.

Additives such as nucleating agents, pigments, colorants, fillers, solvents, and the like can also be added to the adhesive compositions of the present invention.

The adhesive compositions of this invention, which are essentially 100 percent solids, have a melt viscosity in the range of 10,000 to 35,000 centipoise at 375° F., preferably 15,000 to 25,000 centipoise, most preferably 20,000 centipoise.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

88 Grams of low density polyethylene having a melt viscosity at 150° C. of 8500 cps, a saponification number of 5 and Tm of 102° C.; 16 grams ethylene/vinyl acetate copolymer containing 40 weight percent vinyl acetate and a melt index of 70; 78.2 grams of Eastman Resin H-130 hydrocarbon resin tackifier having a density of 1.028 g./cc. at 70° F., melt viscosity of about 1000 cp. at 190° C., and ring and ball softening point of 129° C.; 16 grams of ethylene/propylene rubber having a Mooney melt viscosity of 4.2 cp. at 117° C.; and 1.4 gram of tetrakis[methylene-3-(3',5'-di-t-butyl-4-hydroxyphenyl)propionate]methane and 0.4 grams of disteryl pentaerythritol disphosphite are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive is applied as a thin film to fluorocarbon treated paper which is then bonded to fluorocarbon treated paper to form a bag liner by applying pressure and heat to the two substrates. This adhesive bonded the substrates which on cooling formed an excellent bond between the two substrates.

EXAMPLE 2

88 Grams of low density polyethylene having a melt viscosity at 150° C. of 8,500 cps., a saponification number of 5 and Tm of 102° C.; 78.2 grams of Eastman Resin H-130 hydrocarbon resin tackifier having a density of 1.028 g./cc. at 70° F., melt viscosity of about 1000 cp. at 190° C. and ring and ball softening point of 129° C.; 16 grams of ethylene/propylene rubber having a Mooney viscosity of less than 5 cp. at 150° C.; and 1.4 gram of tetrakis[methylene-3-(3',5'-di-t-butyl-4-hydroxyphenyl)propionate]methane and 0.4 grams of disteryl pentaerythritol diphosphite are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten adhesive is applied as a thin film to fluorocarbon treated paper and pressed to fluorocarbon treated paper by applying pressure and heat to the treated paper substrates. The bonded substrates on cooling did not form a satisfactory bond between the substrates and separated easily.

EXAMPLE 3

88 Grams of low density unmodified polyethylene having a melt viscosity at 3075 cp. at 177° C., density of 0.906 g./cc., and ring and ball softening point of 105° C.; 16 grams ethylene/vinyl acetate copolymer containing 40 weight percent vinyl acetate and a melt index 70; 78.2 grams of Eastman Resin H-130 hydrocarbon resin tackifier having a density of 1.028 g./cc. at 70° C., melt viscosity of about 1000 cp. at 190° C., and ring and ball softening point of 129° C.; 16 grams of ethylene propylene rubber having a Mooney viscosity of 2 cp. at 177° C.; and 0.6 gram of tetrakis[methylene-3-(3',5'-di-t-butyl-4-hydroxyphenyl)-propionate]methane and 0.4 grams of disteryl pentaerythritol diphosphite are placed in a 500 ml. round bottom resin pot fitted with a mechanical stirrer and nitrogen purge line. The system is purged with nitrogen and heated to 200° C. using a metal bath. The polymer blend is stirred for one hour after melting. The blend is cheezy and incompatible and an ageing at 175° C. for 24 hours phase separates. The molten adhesive is applied as a thin film to fluorocarbon treated paper and pressed to another fluorocarbon treated paper by applying pressure and heat to the foils. The adhesive on cooling did not form a satisfactory bond between the substrates.

The hot melt adhesives of the present invention comprising a blend of at least one modified polyethylene resin, an ethylene/vinyl acetate copolymer, a tackifying resin, and an ethylene/propylene rubber provide adhesives having a unique combination of properties for bonding nonporous substrates and having excellent elevated temperature properties. These adhesives provide excellent bond strengths when used for bonding fluorocarbon treated paper substrates which are used in fabricating multiwall bags useful for packaging oil and grease containing products such as dog food and the like.

The invention has been described in detail with particular reference to certain preferred embodiments thereof, but it will be understood that variations and modifications can be effected within the spirit and scope of the invention.

I claim:

1. An adhesive composition capable of being used as a hot melt adhesive comprising a blend of
   (a) about 40 to 50 percent by weight of at least one modified polyethylene having a saponification number of about 3 to 60 prepared by reacting polyethylene with an unsaturated polycarboxylic acid, anhydride or ester thereof,
   (b) about 6 to 10 percent by weight of at least one ethylenevinyl acetate copolymer,
   (c) about 50 to 30 percent by weight of at least one tackifier resin selected from the group consisting of hydrocarbon resin, polyterpene resin and rosin ester resin, and
   (d) about 7 to 15 percent by weight of an ethylene/propylene rubber.

2. An adhesive composition according to claim 1 wherein said ethylene-vinyl acetate copolymer contains from about 30 to about 45 weight percent vinyl acetate.

3. An adhesive composition according to claim 1 wherein said modified polyethylene has a melt viscosity of from about 750 to about 100,000 centipoise at 177° C.

4. An adhesive composition according to claim 3 wherein said tackifier resin is a hydrocarbon tackifier resin.

5. An adhesive composition capable of being used as hot melt adhesive comprising a blend of
   (a) about 42 to 46 weight percent of at least one modified polyethylene having a saponification number of about 3 to 60 prepared by reacting polyethylene with an unsaturated polycarboxylic acid, anhydride or ester thereof,
   (b) about 7 to 9 weight percent of at least one ethylene-vinyl acetate copolymer,
   (c) about 35 to 45 weight percent of at least one tackifier selected from the group consisting of hydrocarbon resin, polyterpene resin or rosin ester resin, and
   (d) about 7 to 10 percent by weight of an ethylene/propylene rubber.

6. An adhesive composition according to claim 5 wherein said ethylene-vinyl acetate copolymer contains about 40 weight percent vinyl acetate.

7. An adhesive composition according to claim 6 wherein said modified polyethylene has a melt viscosity of from about 750 to about 100,000 centipoise at 177° C.

8. An adhesive composition according to claim 7 wherein said tackifier resin is a hydrocarbon tackifier resin.

* * * * *